United States Patent [19]

Iwasaki et al.

[11] Patent Number: 5,240,966
[45] Date of Patent: Aug. 31, 1993

[54] GRANULAR COLORANT AND METHOD FOR PREPARING THE SAME

[75] Inventors: Hirotomo Iwasaki, Warabi; Isao Kitajima, Ibaraki, both of Japan; Giampaolo Barbi, Ferrara; Enrico Constantini, Bologna, both of Italy

[73] Assignees: Dainippon Ink and Chemicals, Inc., Tokyo, Japan; Himont Incorporated, Wilmington, Del.

[21] Appl. No.: 761,041

[22] Filed: Sep. 19, 1991

[30] Foreign Application Priority Data

Sep. 20, 1990 [JP]  Japan .................................. 2-251532

[51] Int. Cl.$^5$ ............................................. C08J 9/224
[52] U.S. Cl. ........................................ 521/54; 521/55; 521/57; 521/84.1; 521/134; 521/143
[58] Field of Search ....................... 521/56, 54, 55, 57, 521/143

[56] References Cited

U.S. PATENT DOCUMENTS

| | | | |
|---|---|---|---|
| 4,379,860 | 4/1983 | Fickel et al. | 521/56 |
| 4,681,632 | 7/1987 | Bes et al. | 106/19 |

FOREIGN PATENT DOCUMENTS 52-58748  5/1977  Japan .
53-36537  4/1978  Japan .
1-108268  4/1989  Japan .

*Primary Examiner*—Morton Foelak
*Attorney, Agent, or Firm*—Armstrong, Westerman, Hattori, McLeland & Naughton

[57] ABSTRACT

A granular colorant for coloring thermoplastic resins such as polypropylene, composed of dye/pigment-containing porous thermoplastic resin grains, which is characterized that a dye/pigment composition containing a dispersing agent and/or a carrier resin having a lower softening point than the porous thermoplastic resin grains and dye/pigment is filled in and/or adhered on the pores and/or surfaces of the porous thermoplastic resin grains, is disclosed. The granular colorant is hardly deteriorated by heat and has excellent handlability, meterability, dispersibility and dilutability.

5 Claims, No Drawings

GRANULAR COLORANT AND METHOD FOR PREPARING THE SAME

BACKGROUND OF THE INVENTION

1. Field of the Invention

The present invention relates to a granular colorant which is hardly deteriorated by heat and which has easy handlability, meterability, dispersibility and dilutability, as well as to a method for preparing the same.

2. Description of the Prior Art

As the granular colorant for coloring thermoplastic resins such as polypropylene, a granular colorant of so-called master batch pellets which are prepared by dispersing a dye/pigment of high concentration in a resin is generally known. Since the master batch pellets are prepared by fully melting and kneading thermoplastic resin pellets as melted, kneaded and pelletized and a dye/pigment at a high temperature, these have a drawback that the thermoplastic resin itself is deteriorated by heat and accordingly the properties of the thermoplastic resin as colored with the colorant of the pellets are thereby worsened. In particular, master batch pellets of polypropylene are easily deteriorated by heat because of the influence of thermal hysteresis caused by melting and kneading, and therefore the colorant of master batch pellets of such deteriorated polypropylene noticeably worsens the properties of polypropylene fibers or films as coated therewith. Under the situation, therefore, development of a granular colorant which is not or is hardly deteriorated by heat is strongly desired.

As examples of a granular colorant which is not or is hardly deteriorated by heat, there have heretofore been known a granular colorant prepared by coating the surfaces of polyalkylene resin pellets with a pigment composition comprising a pigment, a low molecular polyalkylene and an antistatic agent (Japanese Patent Publication No. 46-41459) and a granular colorant prepared by further coating the said granular colorant with a low molecular polyalkylene or the like (Japanese Patent Publication No. 56-35688).

However, these granular colorants have some drawbacks. Precisely, the former granular colorant has a poor adhesiveness between the surfaces of the pellets and the pigment composition so that the pigment composition easily peels off from the surfaces of the pellets and the peeled pellets have reduced meterability, dispersibility and dilutability. On the other hand, the latter granular colorant is somewhat improved, as compared with the former granular colorant, since the pigment composition layer is reinforced by the surface coating layer. However, the adhesiveness between the surfaces of the pellets and the pigment composition still is not improved at all, and the improvement of the colorant is neither sufficient nor substantial. Therefore, it is impossible to fully avoid peeling of the pigment composition from the surfaces of the pellets in handling and operation of the colorant, such as conveyance, transportation, metering, blending and so on thereof.

SUMMARY OF THE INVENTION

In view of the above, the object of the present invention is to provide granular colorant which has an excellent adhesiveness between the said resin grains and the dye/pigment composition so that the dye/pigment composition hardly peels off from the surfaces of the grains. A further object of the present invention is to provide granular colorant which is hardly deteriorated by heat and has excellent handlability, meterability, dispersibility and dilutability. A still further object of the present invention is to provide a method for preparing the granular colorant.

According to an aspect of this invention, there is provided a granular colorant composed of dye/pigment-containing porous thermoplastic resin grains, which is characterized in that a dye/pigment composition containing a dispersing agent and/or a carrier resin having a lower softening point than the porous thermoplastic resin grains and a dye/pigment is filled in and/or adhered on the pores and/or surfaces of the porous thermoplastic resin grains. According to another aspect of this invention, there is provided a method for preparing a granular colorant composed of dye/pigment-containing porous thermoplastic resin grains, wherein a dye/pigment composition containing a dispersing agent and/or a carrier resin having a lower softening point than the porous thermoplastic resin grains and a dye/pigment is filled in and/or adhered on the pores and/or surfaces of the porous thermoplastic resin grains.

Accordingly, the granular colorant of the present invention has an excellent adhesiveness between the resin grains and the dye/pigment and therefore is hardly deteriorated by heat. In addition, it has easy handlability, meterability, dispersibility and dilutability.

The other objects and features of this invention will be further understood from following description.

DETAILED DESCRIPTION OF THE PRESENT INVENTION

The porous thermoplastic resin grains to be used in the present invention may be grains of any and every thermoplastic resin which have plural through-pores. For instance, there are mentioned polyethylene, polypropylene, polystyrene, polymethyl methacrylate, acrylonitrile-styrene copolymer, acrylonitrile-butadiene-styrene copolymer, polyethylene terephthalate, etc. Above all, porous olefin resin grains directly prepared by gaseous phase polymerization are preferred. Spherical porous polypropylene resin grains having a porosity of from 5 to 50% by volume and a mean grain size of from 0.5~5 mm are preferred. In particular, a mean grain size of from 1 to 3 mm is preferred.

As the dispersing agent and/or a carrier resin for use in the present invention, any dispersing agent and carrier resin having a lower softening point than the porous thermoplastic resin grains (or a resin capable of carrying a dye/pigment in a dispersed state under drying condition), which are known to be usable for preparing known colorants, can be employed.

The dispersing agent includes, for example, higher fatty acids and metal salts thereof, higher fatty acid amides, nonionic surfactants, etc. Above all, nonionic surfactants are preferred.

The carrier resin includes, for example, polyethylene wax, polypropylene wax, dispersing agents for modified polyolefin dye/pigments such as Solsperse (product by ICI), low molecular polyamides, hydrogenated dicyclopentadiene oligomers, ethylene-α-olefin oligomers, sugar esters of benzoic acid, modified rosin esters, petroleum resins, etc. Above all, substances which are solid at room temperature are preferred, and in particular, polyolefin wax having a molecular weight of from 1500 to 20,000 is especially preferred.

As the dye/pigment, any and every dye/pigment for thermoplastic resins can be employed. In particular, pigments are especially preferred.

As examples of the pigments for use in the present invention, there are mentioned inorganic pigments such as titanium oxide pigments, iron oxide pigments, cobalt pigments, cadmium pigments, ultramarine, chrome yellow, carbon black, etc.; extender pigments such as calcium carbonate, barium sulfate, etc.; and organic pigments such as azo pigments, condensed azo pigments, phthalocyanine pigments, quinacridone pigments, isoindolinone pigments, anthraquinone pigments, dioxazine pigments, perylene pigments, perynone pigments, etc.

For preparing the granular colorant of the present invention, any method may be employed where a dye/pigment composition containing a dispersing agent and/or a carrier resin having a lower softening point than the porous thermoplastic resin grains and a dye/pigment is filled in and/or adhered on the pores and/or surfaces of the porous thermoplastic resin grains.

As preferred embodiments of the method, there are mentioned, for example:

(1) A method where an aqueous dye/pigment composition containing water, a dispersing agent and a dye/pigment or an oily dye/pigment composition containing a solvent, a carrier resin and a dye/pigment is blended with porous thermoplastic resin grains under a reduced pressure so that the said composition is filled in and/or adhered on the pores and/or surfaces of the said grains, then the pressure is returned to an atmospheric pressure and the grains are dried;

(2) A method where an oily pigment composition containing a solvent, a carrier resin and a dye/pigment is stirred and blended with porous thermoplastic resin grains whereby the said composition is filled in and/or adhered on the pores and/or surfaces of the said grains and then the grains are dried; and (3) A method where a dye/pigment composition which contains a carrier resin and a dye/pigment and which is solid at room temperature is blended with porous thermoplastic resin grains at a temperature not lower than the softening point of the carrier resin but lower than the softening point of the said grains whereby the dye/pigment composition is filled in and/or adhered on the pores and/or surfaces of the said grains, and then the grains are cooled.

Above all, the methods (1) and (3) are preferred.

The above-mentioned method (1) includes, for example, a method where the porous thermoplastic resin grains are filled in a vacuum container, the inner pressure of the container is reduced to a reduced pressure of from 30 to 300 mmHg, preferably from 50 to 150 mmHg, then the aqueous or oily dye/pigment composition is introduced into the container whereby the composition is penetrated into and/or adhered onto the grains, and the inner pressure of the container is thereafter returned back to the atmospheric pressure; and a method where the porous thermoplastic resin grains and the aqueous or oily dye/pigment composition are filled and blended in a vacuum container, then the inner pressure of the container is reduced to a reduced pressure of from 30 to 300 mmHg, preferably from 50 to 150 mmHg whereby the composition is penetrated into and/or adhered onto the grains, and the inner pressure of the container is thereafter returned back to the atmospheric pressure.

The drying temperature in the above-mentioned methods (1) and (2) for drying the granular colorant is generally from 90° to 120° C. when an aqueous dye/pigment composition is employed and from 50° to 80° C. when an oily dye/pigment composition is employed. However, where the granular colorant to be prepared is required to have higher heat-resistance and better pigment-dispersibility especially for the purpose of being applicable to fibers and the like, a drying method is specifically employed in which a solvent having a high melting point and a small vaporization latent heat, such as paraxylene or the like, as well as water is used and the grains are dried by vacuum lyophilization.

The mixer to be employed in the method (3) is not specifically defined but, for example, there are mentioned high-speed mixing means such as Henschel mixer and Nauta mixer, kneading means such as kneader, as well as mixer-type grain-coating means. Above all, high-speed mixing means are preferred.

Impregnation and/or application of the dye/pigment composition to the porous thermoplastic resin grains by blending the composition and the grains is effected under such condition that the temperature of the resulting blend is not lower than the softening point of the carrier resin but lower than the softening point of the said grains, generally for 1 to 20 minutes, and thereafter the thus treated grains are cooled with continued blending.

Where a high-speed mixing means such as Henschel mixer is used, it is preferred that the dye/pigment composition as heated up to the vicinity of the softening point of the carrier resin and the porous thermoplastic resin grains as heated up to a temperature higher than the softening point of the carrier resin but lower than the softening point of the grains are put in the mixer and mixed therein at a high speed for 2 to 10 minutes and thereafter cooled with a cold air, whereby a granular colorant composed of the said porous thermoplastic grains having the dye/pigment composition as uniformly penetrated in and/or adhered on the grains can be obtained with high yield.

Where a dye/pigment composition containing polyethylene wax as the carrier resin and a porous spherical polypropylene are blended in a Henschel mixer, for instance, it is preferred that the dye/pigment composition as heated up to 70° to 80° C. and the porous spherical polypropylene as heated up to 100° to 115° C. are put in the mixer and mixed at 600 to 2000 rpm for 2 to 10 minutes and thereafter a cold air is introduced into the mixer while still mixing the contents at a reduced rotation speed of from 200 to 1000 rpm so as to cool the resulting granular product.

Where a high-speed mixing means such as Henschel mixer is employed, the dye/pigment composition and the porous thermoplastic resin grains are heated by the frictional heat to be generated by blending them. In such case, however, the mixing time would be prolonged and the adhesion strength between the grains and the dye/pigment composition would be low. Accordingly, it is preferred that the mixing means is also heated even in such case.

The aqueous dye/pigment composition comprising water, dispersing agent and a dye/pigment to be used in the above-mentioned method (1) may be one prepared by dispersing a dye/pigment in water by the aid of a dispersing agent such as a surfactant and it generally has a viscosity of from 10 to 500 cps, preferably from 50 to 200 cps. In particular, an aqueous composition containing from 10 to 50 parts by weight of a nonionic surfactant as a dispersing agent per 100 parts by weight of a dye/pigment or an aqueous composition containing an aqueous dispersion of a carrier resin having a dispersing function is preferred, since the composition is to have an excellent dye/pigment dispersibility after dried. As one example of the aqueous dispersion of the carrier resin, there is mentioned a nonionic or anionic acrylic acidic polyethylene wax emulsion having from 20 to 50% by weight of the resin solid content, which is especially preferred.

The method of obtaining the aqueous dye/pigment composition is not specifically defined but, for example, a method where the constitutional components are put in a dispersing and kneading machine to be employed for preparing an ink composition or a coating composition, such as a ball mill, sand mill or three-roll mill, and are dispersed and blended therein can be employed for the purpose.

The oily pigment composition which is employed in the above-mentioned methods (1) and (2) and which contains a solvent, a carrier resin and a dye/pigment may be one prepared by dispersing or dissolving the dye/pigment in the solvent containing the carrier resin as dissolved therein, and it generally has a viscosity of from 10 to 1000 cps, preferably from 50 to 500 cps.

The solvent to be employed in the said methods may be anyone which can dissolve the carrier resin, and it includes, for example, toluene, xylene, methyl ethyl ketone, ethyl acetate, ethyl cellosolve, dimethylformamide, isopropyl alcohol, styrene, etc.

The carrier resin is preferably one which may easily be dissolved in the solvent, and for example, it includes dye/pigment dispersing agents of modified polyolefins, such as hydrogenated dicyclopentadiene oligomers, ethylene-α-olefin oligomers, sugar esters of benzoic acid, Sorsperse (product by ICI), etc.

The method of obtaining the oily dye/pigment is not specifically limited but, for example, a method where the constitutional components are put in a dispersing and kneading machine to be employed for preparing an ink composition or a coating composition, such as a ball mill, sand mill or three-roll mill, and are dispersed and blended therein can be employed for the purpose.

The content of the dye/pigment in the aqueous or oily dye/pigment composition to be employed in the above-mentioned method (1) or (2) is from 2 to 500 parts by weight, preferably from 10 to 100 parts by weight, to 100 parts by weight of the dispersing agent and/or carrier resin. In the granular colorant prepared by penetrating and/or coating the dye/pigment composition on the porous thermoplastic resin grains, the amount of the said dye/pigment composition as penetrated and/or adhered on the grains is generally from 10 to 300 parts by weight, preferably from 20 to 100 parts by weight, to 100 parts by weight of the said grains.

The dye/pigment composition containing a carrier resin and a dye/pigment, which is solid at room temperature and which is employed in the above-mentioned method (3) may be one prepared by dispersing a dye pigment in a carrier resin. In particular, such that may have an apparent viscosity of from 1 to 25,000 cps when heated and melted at a temperature lower than the softening point of the porous thermoplastic resin grains is preferred, since it may be uniformly adhered to the said grains with ease.

The method of preparing the dye/pigment composition which is solid at room temperature and which is employed in the said method (3) is not specifically defined but, for example, there are mentioned (i) a method where a carrier resin such as polyolefin wax, preferably a carrier resin having a softening point of about 100° C. or so such as polyethylene wax, and a water-containing cake of a pigment are kneaded with a resin kneading means such as Banbury mixer, kneader, three-roll mixer or a poly-axial extruder, at a temperature not lower than the softening point of the carrier resin with flushing water thereinto to thereby obtain a pigment composition (pigment-flushing method) and (ii) a method where a carrier resin, preferably a polyolefin wax, and a dye/pigment are kneaded with the same resin kneading means as that employed in the method (i) at a temperature not lower than the softening point of the carrier resin so as to obtain a dye/pigment composition.

The content of the dye/pigment in the said dye/pigment composition is generally from 2 to 500 parts by weight, preferably from 10 to 200 parts by weight, to 100 parts by weight of the carrier resin. In the granular colorant prepared by penetrating and/or coating the dye/pigment composition on the porous thermoplastic resin grains, the amount of the said dye/pigment composition as penetrated and/or adhered on the grains is generally from 10 to 300 parts by weight, preferably from 50 to 150 parts by weight, to 100 parts by weight of the said grains.

For obtaining a colored shaped product of a thermoplastic resin by the use of the granular colorant of the present invention, the granular colorant and the thermoplastic resin to be colored and shaped are blended and then shaped. Especially preferably, a spherical thermoplastic resin is used, whereupon uniform blending with the granular colorant is easy and the colorant and the thermoplastic resin thus blended are not separated from each other. Accordingly, a shaped product with a uniform color hue may preferably be obtained, and the case is especially suitable for coloration of fibers, etc.

The thermoplastic resin to be colored is preferably a resin of the same kind as that of the porous thermoplastic resin grains used as the nuclei of the granular colorant and/or a resin which is compatible with the said resin grains.

EXAMPLES

The present invention will be explained in more detail by way of the following examples and comparative examples, where all "parts" and "percentages (%)" are by weight except that the porosity only is represented by percentage by volume.

EXAMPLE 1

1 kg of a press cake containing 50% of phthalocyanine blue (C.I. Pigment Blue 15-3) and 1 kg of polyethylene wax having a mean molecular weight of 3500 were put in a one gallon-kneader and heated up to 120° C. and then stirred for 1 hour, whereby the pigment was completely penetrated into the resin phase, and thereafter the water was separated from the phase. This was further mixed for 30 minutes under reduced pressure whereby the remaining water was distilled out. Next, the content was stirred for 20 minutes with cooling the kneader with water so as to cool the content, which was then ground with a grinding mill to obtain a phthalocyanine blue-containing pigment composition (1) having a grain size of 2 mm or less.

Next, 1 kg of the pigment composition (1) as heated up to 80° C. with a drier and 1 kg of a spherical porous polypropylene (product by HIMONT, U.S.A., porosity 21%; melt index 29 g/10 min) as heated up to 120° C.

with a fluidizing drier were put in a 20 liter-Henschel mixer (manufactured by Mitsui-Miike Mfg. Co.) having a temperature of 70° C. and mixed at a rotation speed of 1500 rpm for 3 minutes, whereby the pigment composition (1) was uniformly penetrated into the pores of the spherical porous polypropylene grains and adhered onto the surfaces thereof, and thereafter the resulting grains were still mixed for 10 minutes at a rotation speed of 800 rpm with cooling to thereby obtain 1.92 kg of a granular colorant (I). The cross section of the granular colorant (I) was observed with a 200-magnification optical microscope, which indicated that the pigment composition (I) was filled into the middle of the pores of the spherical porous polypropylene grains.

The porosity of the spherical porous polypropylene used was measured as mentioned below.

The porosity in percentage of voids is determined by using a dilatometer with a calibrated capillary having diameter of 3 mm (model CD 3, C. Erba) and connected to a mercury tank and to a forced vacuum rotating pump ($1 \cdot 10^{-2}$ mba). A weighed amount of sample (about 0.5 g) is introduced into the dilatometer and the apparatus is brought under forced vacuum ($<0.1$ mmHg). After 10 min, the dilatometer is filled with mercury till the level marked on the capillary at 10 cm height is reached. Once this operation is finished, the valve connecting the dilatometer to the vacuum pump is closed and the apparatus is brought under pressure with nitrogen (2.5 kg/cm$^2$). Owing to the pressure effect, the mercury penetrates into the pores. The greater the porosity of the test product, the more the mercury level will decrease.

With the following values known:
R cm = capillary radius
ΔH cm = difference between level at 10 cm height and final level of the mercury column
the volume of the sample pores is calculated as follows:

$$V = R^2 \pi \Delta H$$

Also, with the following values known:
P gr = sample weight
P1 gr = weight of dilatometer + mercury
P2 gr = weight of dilatometer + mercury + sample
D = mercury density (at 25° C. = 13.546 gr/cm$^3$)
the sample volume (V1) is calculated as follows:

$$V1 = \frac{P1 \cdot (P2 - P)}{D}$$

Therefore the porosity results from the following formula:

$$\text{Porosity \%} = \frac{100 \cdot v}{V1}$$

EXAMPLE 2

5 kg of carbon black and 7.5 kg of polyethylene wax having a mean molecular weight of 5000 were put in a 3 gallon-pressure kneader and kneaded for 1 hour at 120° C. Next, the content was continuously kneaded for further 20 minutes with cooling the jacket of the kneader with water so as to cool the content, which was then passed through a three-roll mill two times and thereafter finely ground with a Henschel mixer. Accordingly, a carbon black-containing a powdery pigment composition (2) was obtained.

25 kg of the pigment composition (2) and 25 kg of a spherical porous polypropylene (produced by HIMONT, U.S.A., porosity 28%, melt index 14 g/10 min) were put in a 100 liter-Nauta mixer and mixed for 30 minutes with heating up to 120° C. with a steam, whereby the pigment composition (2) was uniformly penetrated into the pores of the spherical porous polypropylene grains and adhered onto the surfaces thereof, and thereafter the jacket of the mixer was gradually cooled with still stirring. Accordingly, 48.3 kg of a granular colorant (II) was obtained.

EXAMPLE 3

A diazo yellow-containing pigment composition (3) having a grain size of 2 mm or less was obtained in the same manner as in Example 1, except that 2 kg of a press cake containing 50% of diazo yellow (C.I. Pigment Yellow 83) was employed in place of 1 kg of the water-containing press cake of β-type phthalocyanine blue.

Next, 1 kg of the pigment composition (3) as heated up to 80° C. with a drier and 1 kg of a spherical porous polypropylene (porosity 28%, melt index 14 g/10 min) as heated up to 120° C. with a fluidizing drier were added to a 20 liter-Henschel mixer (manufactured by Mitsui-Miike Mfg. Co.) having a temperature of 70° C. and blended for 5 minutes at a rotation speed of 300 rpm for the lower blades and 1200 rpm for the upper blades, whereby the pigment composition (3) was uniformly penetrated into the pores of the spherical porous polypropylene grains and adhered on the surfaces thereof, and thereafter the resulting content was continuously stirred for further 5 minutes at a rotation speed of 200 rpm for the lower blades and 800 rpm for the upper blades while still cooling the jacket of the mixer with water. Next, the content in the mixer was spontaneously cooled as it was for 10 minutes and then taken out from the mixer after it was cooled to about 50° C. Accordingly, 1.88 kg of a granular colorant (III) was obtained.

EXAMPLE 4

6 kg of rutile-type titanium oxide and 4 kg of polyethylene wax having a mean molecular weight of 3500 were put in a 3 gallon-pressure kneader and kneaded for 40 minutes at 120° C. to obtain a pigment composition (4). 10 kg of spherical porous polypropylene (porosity 28%; melt index 14 g/10 min) was added thereto and further kneaded for 10 minutes, whereby the pigment composition (4) was uniformly penetrated into the pores of the spherical porous polypropylene grain and adhered onto the surfaces thereof, and afterwards the jacket of the mixer was cooled with water so as to gradually cool the content in the mixer with still kneading the same. Accordingly, 19.4 g of a granular colorant (IV) was obtained.

EXAMPLE 5

400 g of phthalocyanine blue (C.L. Pigment Blue 15-3) was added to a system prepared by well blending 200 g of nonionic surfactant (polyoxyethylene nonylphenyl ether), 400 g of 35% solid content-having acrylic acid-modified polyethylene was emulsion and 1000 g of water and pre-mixed. The resulting premix was transferred into a 3 liter-Dyno mill and milled continuously for 3 hours to obtain 1920 g of an aqueous pigment dispersion (5).

Next, 500 g of spherical porous polypropylene (porosity 28%, melt index 14 g/10 min) was put in a closable container, and the inner pressure of the container was reduced to 100 mmHg or lower by the use of a vacuum pump. Afterwards, 800 g of the aqueous pigment dispersion (5) was introduced into the closed container through the sealing cock. After introduction, the inner pressure of the container was returned back to the atmospheric pressure, whereby the aqueous pigment dispersion (5) was filled into the pores of the spherical porous polypropylene grains additionally with adhering the same onto the surfaces of the grains. The blend was taken out from the container and filtered and the resulting residue was dried for 3 hours to obtain 637 g of a granular colorant (V).

EXAMPLE 6

400 g of nonionic surfactant was dissolved in 1000 g of a hot water, and 500 g of isoindolinone yellow (C.I. Pigment Yellow 110) was added thereto and premixed. Next, this was milled in a 3 liter-Dyno mill for 3 hours to obtain an aqueous pigment dispersion (6). Next, 500 g of spherical porous polypropylene (produced by HI-MONT, U.S.A., porosity 34%, melt index 30 g/10 min) and 1000 g of the aqueous pigment dispersion (6) obtained above were put in a 3 liter-closable container and well stirred with a mixer. With stirring, the inner pressure of the container was gradually reduced with a vacuum pump to about 50 mmHg over a period of 10 minutes. Afterwards, the inner pressure was then returned back to the atmospheric pressure, whereby the aqueous pigment dispersion (6) was uniformly filled into the pores of the spherical porous polypropylene grains and adhered onto the surfaces thereof, and thereafter the remaining aqueous pigment dispersion was removed by filtration. After dried with a hot air, 620 g of a granular colorant (VI) was obtained. The cross section of the granular colorant (VI) was observed with a 200-magnification microscope, which indicated that the pigment dispersion was penetrated into the depth of the pores of the spherical porous polypropylene grains.

EXAMPLE 7

400 g of phthalocyanine green (C.I. Pigment Green 7) and 300 g of Solsperse 24000 (product of ICI, modified polyolefin-type dye pigment dispersing agent) were added to 1300 g of paraxylene and premixed. The resulting premix was put in a 3 liter-Dyno mill and milled for 2 hours and 30 minutes to obtain an oily pigment dispersion (7). Next, 1000 g of the pigment dispersion (7) and 500 g of spherical porous polypropylene (porosity 34%; melt index 30 g/10 min) were put in a closable container, which was then closed. The inner pressure of the container was gradually reduced to 100 mmHg over a period of 5 minutes with stirring the content, and thereafter it was returned back to the atmospheric pressure whereby the oily pigment dispersion (7) was filled into the pores of the spherical porous polypropylene grains and adhered onto the surface thereof. Afterwards, the excess dispersion was filtered off and the resulting residue was lyophilized (freeze-dried) in vacuum to obtain 628 g of a granular colorant (VII).

EXAMPLE 8

An oily pigment dispersion (8) was obtained in the same manner as in Example 7, except that azolake red (C.I. Pigment Red 48-2) was used in place of phthalocyanine green and Lucant HC-10 (produced by Mitsui Petrochemical Co., ethylene-α-olefin oligomer) was in place of Solsperse 24000. This was processed also in the same manner as in Example 7 and 640 g of a granular colorant (VIII) was obtained.

EXPERIMENTAL EXAMPLE 1

5 parts of each of the granular colorants (I) to (VIII) obtained in Examples 1 to 8 and polypropylene pellets (melt index 1 g/10 min) were kneaded with a 2-roll mill, and a 1 mm thick sheet was formed therefrom. Any ten points of the sheet were observed with a 200-magnification optical microscope, which indicated that the sheet was a well pigment-dispersed colored PP sheet (polypropylene sheet) where pigment coagulants of a size of 15 μm or more were observed in none of the all microscopic visual ranges. Above all, the sheets colored with anyone of the granular colorants (I), (III). (IV) and (V) showed an excellent pigment dispersibility, where pigment coagulants of a size of 10 μm or more were observed in none of the all microscopic visual ranges.

COMPARATIVE EXAMPLE 1

A granular colorant (IX) was prepared in the same manner as in Example 1, except that melt-extruded polypropylene pellets (melt index 1 g/10 min) were used in place of the spherical porous polypropylene.

EXPERIMENTAL EXAMPLE 2

500 g of each of the granular colorants (I) to (VIII) obtained in Examples 1 to 8 or the granular colorant (IX) obtained in Comparative Example 1 were shaken with a sieve-shaker for 20 minutes, and the proportion of the dye pigment composition as peeled off from the colorant was measured. In the cases of the granular colorants (I) to (VIII), the peeled percentage was less than 1% of the colorant composition except the spherical porous polypropylene; while in the case of the granular colorant (IX), the peeled percentage was 7.8%.

What is claimed is:

1. A method for preparing a granular colorant comprising dye/pigment-containing porous thermoplastic polyolefin resin grains, wherein a dye/pigment composition containing a dye pigment and at least one of a dispersing agent and a carrier resin, each having a lower softening point than the porous thermoplastic polyolefin resin grains and said dye/pigment is absorbed in the pores and/or absorbed on surfaces of the porous thermoplastic resin grains, wherein the porous thermoplastic polyolefin resin grains are directly prepared by polymerization and have a porosity of from 5 to 50% by volume.

2. The method as claimed in claim 1, wherein said dye/pigment composition is either an aqueous dye-pigment composition containing water, a dispersing agent and a dye/pigment or an oily pigment composition containing a solvent, a carrier resin and a dye/pigment, said dye/pigment is absorbed in said pores or absorbed on said surfaces of the porous thermoplastic polyolefin resin grains under a reduced pressure and then the grains are dried.

3. The method as claimed in claim 1, in which a dye/pigment composition which contains a carrier resin and a dye/pigment and which is solid at room temperature is blended with porous thermoplastic polyolefin resin grains at a temperature not lower than the softening point of the carrier resin but lower than the softening point of the porous thermoplastic polyolefin resin grains whereby the composition is absorbed in or adhered on the surfaces of the porous thermoplastic polyolefin resin grains and then the resulting grains are cooled.

4. The method as claimed in claim 1, 2, or 3, in which the porous thermoplastic polyolefin resin grains are polypropylene grains as directly prepared by polymerization of monomers consisting essentially of propylene.

5. The method of claim 1, wherein said porous thermoplastic polyolefin grains possess a mean grain size of from 0.5 to 5.0 mm.

* * * * *